US005249946A

United States Patent [19]

Marx

[11] Patent Number: 5,249,946

[45] Date of Patent: Oct. 5, 1993

[54] PLATE FORMING DIE SET

[75] Inventor: Ronald P. Marx, Appleton, Wis.

[73] Assignee: James River Corporation of Virginia, Richmond, Va.

[21] Appl. No.: 884,302

[22] Filed: May 11, 1992

Related U.S. Application Data

[63] Continuation of Ser. No. 666,618, Mar. 8, 1991, abandoned.

[51] Int. Cl.[5] .......... B29C 43/04

[52] U.S. Cl. .......... 425/142; 100/196; 425/145; 425/305.1; 425/339; 425/397

[58] Field of Search .......... 100/194, 195, 196, 208; 264/40.7, 160; 425/142, 145, 169, 305.1, 339, 341, 302.1, 394, 397, 403.1, 406

[56] References Cited

U.S. PATENT DOCUMENTS

| | | | |
|---|---|---|---|
| 2,521,625 | 9/1950 | Benge | 425/339 |
| 2,728,468 | 12/1955 | Siempelkamp | 100/196 |
| 2,878,728 | 3/1959 | Clark | 100/196 |
| 3,077,271 | 2/1963 | Siempelkamp | 100/196 |
| 3,521,323 | 7/1970 | Hesch | 425/305.1 |
| 3,565,725 | 2/1971 | Siempelkamp | 425/169 |
| 3,695,464 | 10/1972 | Kaji . | |
| 3,824,058 | 7/1974 | Axer et al. | 425/339 |
| 4,130,050 | 12/1978 | Graf | 93/1 D |
| 4,242,293 | 12/1980 | Dowd | 425/305.1 |
| 4,427,476 | 1/1984 | Beck et al. | 156/199 |
| 4,609,140 | 9/1986 | Van Handel et al. | 229/2.5 R |
| 4,636,348 | 1/1987 | Whiteside | 264/544 |

*Primary Examiner*—Scott Bushey
*Attorney, Agent, or Firm*—Sixbey, Friedman, Leedom & Ferguson

[57] ABSTRACT

An apparatus for press forming products having a desired shape from a web is provided. The apparatus includes a cyclically operating blanking section for cutting the web to produce a single blank for each blanking cycle and a cyclically operating forming section for receiving a plurality of single blanks from the blanking section during a first portion of each forming cycle and for press forming the plurality of single blanks into a plurality of three dimensional press formed paperboard products having the desired shape during a second portion of each forming cycle. The forming section includes a die set having a plurality of forming die cavities wherein each of the forming die cavities receives a single blank. The blanking section operates cyclically at a predetermined rate r and the die set of the forming section includes n forming die cavities, the blanking section operating at n cycles for each forming cycle and the forming section operating cyclically at a rate r/n.

6 Claims, 4 Drawing Sheets

40
42
44
46
48
50
52
54
60
62
64
66
67
68
69
70
70'
72
72'
74
74'
76
76'
80
84
84'
85
85'
86
90
90'
92
92'
96
96'
98
98'
100
100'
102
102'
104
104'
106
106'
32
33
34
36
37
38
41

PLATE FORMING DIE SET

This application is a continuation of Ser. No. 07/666,618, filed Mar. 8, 1991, now abandoned.

BACKGROUND OF THE INVENTION

1. Technical Field

This invention relates to the field of apparatus for forming pressed paperboard products such as paper trays and plates.

2. Description of Related Art

Paperboard products, such as trays and plates, are formed, generally, by a method of molding fibers from a pulp slurry into the desired form of the product or by pressing a paperboard blank between forming dies into the desired shape. Manufacturing of paper products by the press forming process provides a number of advantages typically not found in products produced by other methods, such as the molded pulp process. Pressed paperboard products can be decorated and coated with a liquid-proof coating before being stamped by the forming dies into the desired shape whereas pulp molding processes permit the coating and decoration steps to occur only during or after the molding step. Coating and decorating a non-planar surface normally tends to be more expensive and difficult. Further, pressed paperboard products generally cost less, and require less storage space and can sometimes be transported in a collapsed condition, unlike molded pulp articles. Because press formed paperboard products can be manufactured more cost effectively than molded pulp articles and can be provided with features which improve product functionality and use, the press forming process is practiced by a substantial number of manufacturers in the paper product industry.

In press forming paperboard products, the apparatus which is typically utilized comprises, generally, a supply of paperboard in the form of a web on a reel, a blank and scoring section for cutting and scoring blanks having desired dimensions and a forming section including a die set for receiving blanks and press forming the blanks to form a finished paperboard product of the desired size and shape, such as is disclosed in U S. Pat. No. 4,609,140 to Van Handel et al and U.S. Pat. No. 4,606,496 to Marx, et. al. In most cases, a pre-printed pattern is disposed on the surface of the paperboard web, such that blanking must occur in proper registration with the feeding of the web. Further, in an apparatus of this type, both the blanking and forming sections are cyclically operated and the blanking and forming operations (i.e., cycles) must be accurately synchronized in order to ensure that each blank is accurately positioned at the appropriate time in the die cavity of the forming section's die set. The timing and proper placement of the blank in the die cavity is crucial to the formation of a sufficiently rigid and well-defined paperboard product having the desired shape, such as is desirable by the ultimate consumer.

The typical press forming apparatus, such as is described above, while being suitable for producing a satisfactory press formed product having the desired rigidity and shape characteristics, does not operate with maximum efficiency (i.e., the number of products produced on a per cycle basis), and further, is substantially limited with respect to output capacity (i.e., the number of products produced per minute). In operation of the above described apparatus, a single blank is cut and a single press formed product is produced per forming section cycle. Therefore, to increase efficiency the number of products produced per cycle must be increased and to increase output capacity the rate at which the blanking and forming sections operate must be increased. Increasing the number of products produced per forming cycle is, however, extremely limited in that only a single die cavity for receiving blanks is provided. Further, the number of products produced per minute is limited by the maximum number of cycles per minute at which the blanking and/or forming sections may be operated. The maximum cycle rate of blanking apparatus is approximately 80 to 150 cycles per minute, while the maximum cycle rate of forming apparatus is approximately 40 to 50 cycle per minute. Operation in excess of these maximum cycle rates would result in considerable registration problems, with respect to the blanking operation. Such high speed operation can also lead to a significant breakdown in synchronization between the blanking and forming sections, thereby causing blanking out of registry and positioning improperly of blanks in the forming section. Lack of synchronization may also cause the finished products to have incorrect patterning, distorted shapes, imprecise pleat formation and insufficient rigidity characteristics. Manufacturers of pressed paper products would be in a better position to capitalize on their inherent lower manufacturing costs if press forming apparatus could be designed to operate more efficiently with increased output capacity, increasing the number of products press formed per cycle and produced per minute, while still consistently forming finished products having the desired pattern, shape and rigidity characteristics.

One typically utilized method for increasing productivity by increasing the number of products produced per minute is to operate a plurality of parallel process lines of press forming apparatus. While increasing overall manufacturing productivity, this alternative is very costly and is limited by the availability of manufacturing floor space (i.e., because the apparatus are placed side by side). There is a need for an alternative method and accompanying apparatus, which can increase productivity by increasing the number of products produced per cycle and per minute by each press forming apparatus, operating individually or in a parallel processing line environment.

Many attempts have been made to overcome the limitations on efficiency and output capacity of the typical press forming apparatus. A known method and apparatus for press forming paperboard products with increased efficiency and output capacity is to feed multiple blanks into a single die cavity for each cycle of the forming section. This method of operation and accompanying apparatus, as shown for example in U.S. Pat. No. 4,242,293 to Dowd, results in a substantial increase in the number of press formed products produced per cycle and per minute, limited only by the maximum number of blanks which may be placed in the single die cavity during each forming cycle and the maximum cycle rate of the blanking section. While increasing efficiency and output capacity, press forming multiple blanks in a single die cavity results, generally, in the formation of a paperboard product of a very poor quality, unsuitable both functionally and aesthetically for many of the end uses contemplated by the ultimate consumer. As a result of the stacking of multiple blanks in a single die cavity, the compressive forces exerted on each of the blanks will be different. It is crucial that the compressive forces exerted on each blank be sufficient to cause the occurrence of fiber bonding in order to impart the finished product with sufficient rigidity to withstand the stresses of normal everyday use by the ultimate consumer. In addition, the positioning of each blank relative to the upper and lower forming surfaces of the die plates will also be different. It is very important to and expected by the ultimate consumer that each finished paperboard product consistently have the same well-defined shape. In view of the foregoing, the multiple blank per cavity press forming method and apparatus cannot consistently produce sufficiently rigid and well-defined shaped paperboard products as is clearly desirable by both the manufacturer and the ultimate consumer.

Other attempts at increasing efficiency and output capacity of press forming apparatus are characterized by providing a forming section (i.e., die set) having multiple die cavities, thereby increasing the number of products produced per forming cycle. In particular, a press forming apparatus is provided including a first web for feeding a first cavity of a dual cavity die set and a second web for feeding a second cavity of the dual cavity die set, such as is disclosed in U.S. Pat. Nos. 4,636,348 to Whiteside and U.S. Pat. No. 4,427,476 to Beck et al. The patents to Whiteside and Beck et al., although being directed to the press formation of thermoplastic materials and the like, do disclose press forming apparatus having the capability to increase the number of products produced per forming cycle. However, increasing efficiency and output capacity by the provision of a different web for feeding each die cavity of a dual cavity die set would not be acceptable with respect to a paperboard web and the products press formed therefrom, in view of the substantial increase in manufacturing costs, as a result of the purchase price, maintenance and operating expenses associated with each additional web feeding mechanism, registration system and blanking apparatus, as well as, the significant additional manufacturing floor space that would be required.

Notwithstanding the known apparatus for increasing efficiency and output capacity for the press forming of paperboard products, there is a need for a press forming method and apparatus which can operate efficiently, by increasing the number of products produced per cycle, with an increased output capacity, by increasing the number of products produced per minute, while not requiring a substantial increase in manufacturing costs or floor space and consistently producing finished products having superior shape definition, rigidity and patterning characteristics.

SUMMARY OF THE INVENTION

The primary object of the present invention is to overcome the deficiencies of the prior art described above by providing an apparatus for press forming products which operates with increased efficiency, by increasing the number of press formed products produced per cycle, and output capacity, by increasing the number of press formed products produced per minute.

Another key object of the present invention is to provide a press forming apparatus for consistently producing three dimensional press formed paperboard products having superior shape definition, rigidity and patterning characteristics.

Yet another object of the present invention is to provide a press forming apparatus comprising a cyclically-operating forming section having a die set including a plurality of forming die cavities wherein each forming die cavity receives a single paperboard blank for ensuring, upon press forming of the blanks, that the compressive forces and positioning relative to the forming surfaces are the same for each blank so that the press formed product produced will have sufficient rigidity to withstand the stresses exerted on the product during normal use and the desired, well-defined shape.

Still another object of the present invention is to provide a press forming apparatus comprising a cyclically-operating forming section having a die set including n forming die cavities and a blanking section operating cyclically at a predetermined rate r, wherein the blanking section operates at n cycles for each forming cycle and the forming section operates cyclically at a rate r/n.

Another object of the present invention is to provide a press forming apparatus comprising a web and cyclically operating blanking and forming sections, wherein the blanking section receiving the web is able to operate at its maximum rate of 80 to 100 cycles per minute, while maintaining registration with the web and synchronization with the forming section, which can receive and press form 80 to 100 blanks per minute while operating at 40 to 50 cycles per minute by the provision of two forming die cavities in the die set of the forming section for receiving blanks from the blanking section.

Still another object of the present invention is to provide a press forming apparatus comprising a cyclically-operating forming section having a die set including a plurality of stacked forming die cavities.

Yet another object of the present invention is to provide a press forming apparatus comprising a web having a predetermined repeating characteristic, a cyclically operating forming section having a die set including a plurality of forming die cavities and a cyclically operating blanking section for receiving the web and cutting blanks, wherein proper registration of the web with the blanking section is assured by including a registration device having a sensing means for detecting the repeating web characteristic to control the cyclic operation of the blanking section in a manner to cause all of the cut blanks to have the same positioned relationship with respect to the repeating web characteristic whereby only a single registration device is required to assure properly registered blanks for all of the plurality of forming die cavities.

Another object of the present invention is to provide a press forming method and apparatus comprising a forming section including a die set having a plurality of forming die cavities defined by a plurality of first and second forming die plates, the first and second forming die plates being positioned between two of a plurality of base plates, wherein one base plate is stationary and the remaining base plates are mounted for reciprocating movement toward and away from the stationary base plate by a single driving mechanism connected to one of the reciprocating base plates.

The invention of the present application achieves these objects and others by providing an apparatus for receiving a web and press forming blanks into products having a desired shape comprising a cyclically operating blanking section for cutting the web to produce a single blank for each blanking cycle and a cyclically operating forming section for receiving a plurality of single blanks from the blanking section during a first portion of each forming cycle and for press forming the plurality of single blanks into a plurality of three dimensional press formed paperboard products having the desired shape during a second portion of each forming cycle. The forming section includes a die set having a plurality of vertically stacked forming die cavities wherein each of the forming die cavities receives a single blank during a first portion of each forming cycle. Each forming die cavity is defined by first and second forming die plates positioned between two of a plurality of base plates, wherein one base plate is stationary and the remaining base plates are mounted in vertically stacked relationship for reciprocating movement toward and away from the stationary base plate. A press operating means is connected to the uppermost reciprocating base plate for pressing the plurality of reciprocating base plates together and for releasing pressure to allow said base plates to return to their fully retracted positions. While in their retracted positions, a single blank of said plurality of blanks is positioned in each of the respective forming die cavities. Application of pressure to the uppermost base plate causes the plurality of blanks to be press formed simultaneously into the desired three dimensional product shape.

In a preferred embodiment, the press forming apparatus comprises a cyclically operating blanking section operating at a rate of 80 to 100 cycles per minute and a cyclically operating forming section operating at a rate of 40 to 50 cycles per minute, when the forming section includes a die set having two forming die cavities, or 20 to 25 cycles per minute, when the forming section includes a die set having four forming die cavities. The number of press formed products produced by the press forming method and apparatus, in the preferred embodiment of the subject invention, is 80 to 100 products per minute.

Still other and more specific objects and features of this invention may be understood from an examination of the following description of the preferred embodiment.

DETAILED DESCRIPTION OF THE PREFERRED EMBODIMENT

Throughout this application, the words "inward", "inwardly", "innermost", "outward", "outwardly" and "outermost" will correspond, respectively, to the directions toward and away from the surface supporting the press forming apparatus (e.g., a manufacturing plant floor).

Figure 1:
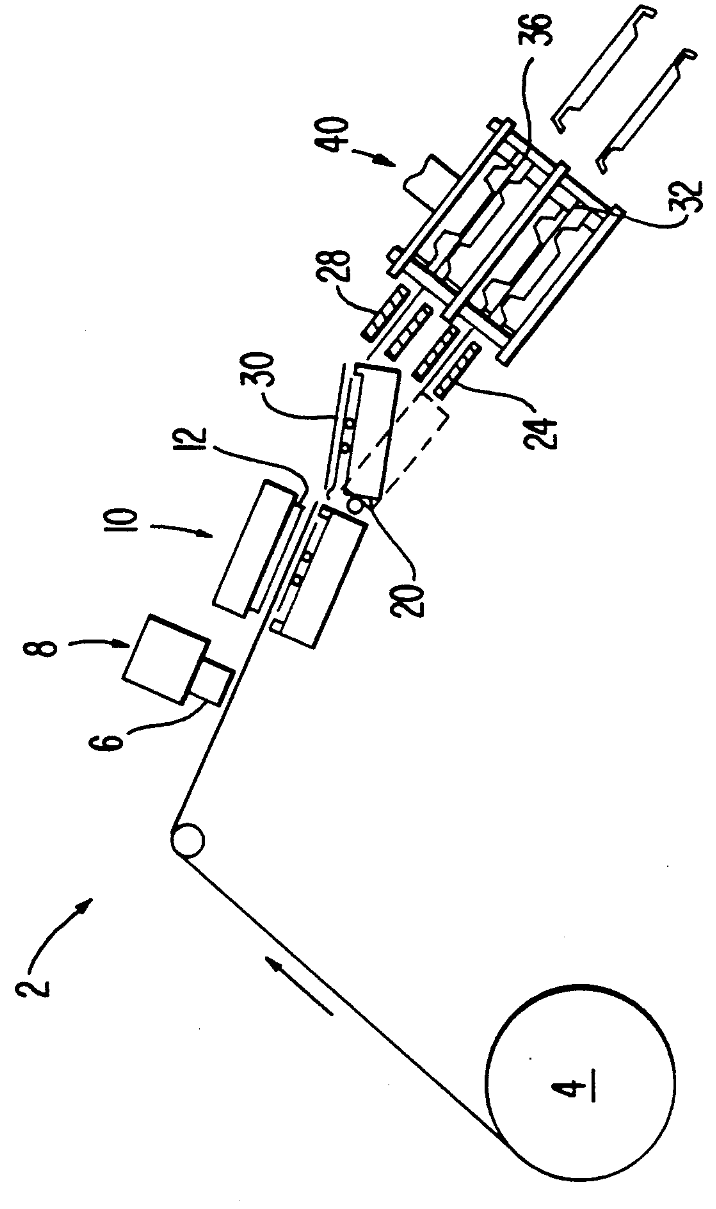
FIG. 1 is a schematic representation of an apparatus for producing press formed paperboard products.

Referring to FIG. 1, an apparatus for press forming paperboard into a three dimensional product is schematically illustrated. The press forming apparatus 2 includes a reeled web 4 for providing a constant supply of paperboard to a cyclically operating blanking section 10. The blanking section 10 cuts the paperboard web 4 to produce a single paperboard blank 30 for each blanking section cycle. A cyclically operating forming section 40 receives the blanks 30 produced by the blanking section 10 and press forms the blanks 30 to the desired three dimensional product shape.

Preferably, the reeled web 4 of the present invention is a unitary, flat piece of paperboard stock conventionally produced by a wet laid papermaking process. The paperboard is typically bleached pulp furnish with double clay coating on one side. Typically, the products produced by the press forming apparatus of the present invention will be plates, trays, containers and the like and the applications for which the press formed products are utilized involve holding food or liquids. Accordingly, one side of the paperboard web is preferably coated with one or more layers of a known liquid-proof coating material. It is also preferred that the coatings selected be heat resistant.

One side of the paperboard web 4 may be printed with a repeating pattern or design or some other type of repeating characteristic, such as spacing marks printed along the trim edge of the web, before application of the liquid proof coating. The web's repeating characteristic in the form of spacing marks or the repetitive printed pattern, aside from any aesthetic value, function as photo-targets, indicating to a photosensory controller 6 of a registration device 8 when the web 4 is in the proper position, relative to the blanking section 10, for cutting. This registration device 8 will ensure that the web 4 is in proper registration with the blanking section 10, such that each blank 30 which is cut will consistently have the desired design or pattern printed thereon.

The blanking section 10 typically includes a cutting die 12 for cutting the web 4 to produce a single blank 30 having the desired size and geometrical shape. In the press forming apparatus 2 of the present invention, a blanking section 10 which can operate at a rate of 80 to 150 cycles per minute is preferred, such as is disclosed for example in U.S. Pat. No. 4,545,670 to Martin and U.S. Pat. No. 4,921,154 to Abe et al.

The press forming apparatus 2 of the present invention includes a movable guide 20 and first and second stationary guides 24 and 28 for directing the blanks 30 from the blanking section 1 to the forming section 40. The movable guide 20 is adapted to pivot between a first position, as depicted in FIG. 1 in phantom, wherein the blank 30 is received in the movable guide 20 and is directed through the first stationary guide 24 to the forming section 40, and a second position, wherein the blank 30 is received in the movable guide 20 and is directed through the second stationary guide 28 to the forming section 40.

Figure 2:
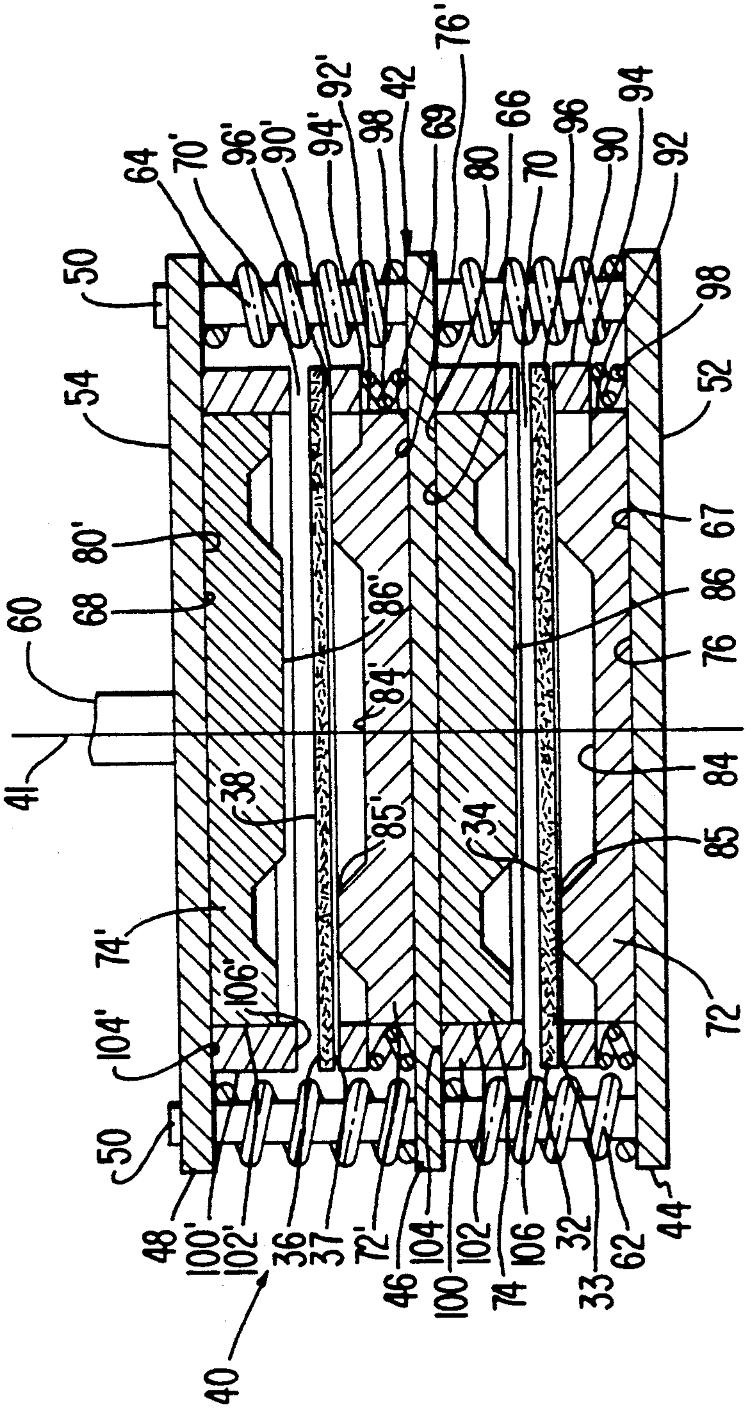
FIG. 2 is a cross-sectional view of the forming section of the press forming apparatus in accordance with the preferred embodiment of the present invention, wherein the reciprocating base plates are in their fully retracted position.
Figure 3:
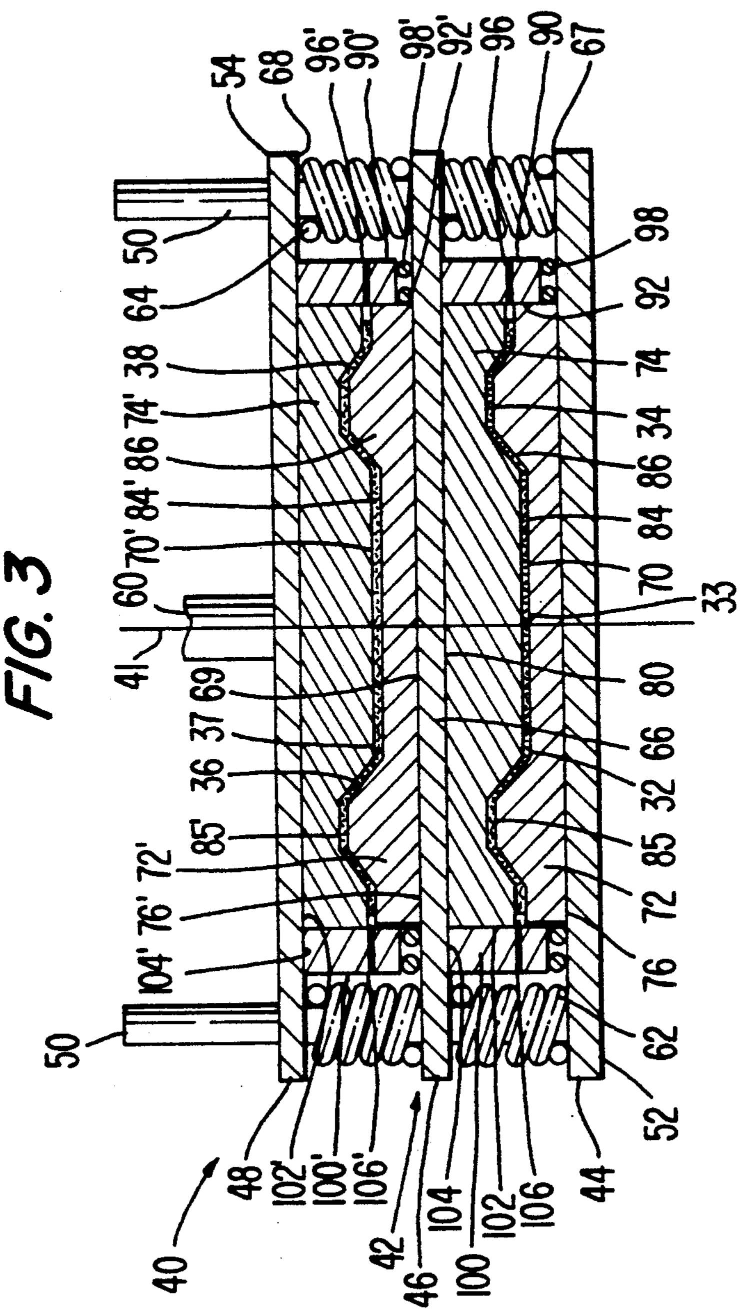
FIG. 3 is a cross-sectional view of the forming section of the press forming apparatus in accordance with the preferred embodiment of the present invention, wherein the reciprocating base plates are in their fully advanced position.

Referring now to FIGS. 2 and 3, the forming section 40 is shown and will be described in more detail. The forming section 40 is comprised of a die set 42 including a stationary base plate 44, and first and second reciprocating base plates 46 and 48, mounted in vertically stacked relationship for reciprocating movement on posts 50 in a direction that is oblique to a vertical plane. The stationary base plate 44 on its lower side 52 is adapted to rest on a support surface (not shown), such as, for example, within a die press adapted to operate the die set 42. The uppermost reciprocating base plate 48 on its upper side 54 is connected to a press operating mechanism (not shown) by a link 60 for pressing the first and second reciprocating base plates 46 and 48 together, to their fully advanced positions, as shown in FIG. 3, and for releasing pressure to allow the first and second reciprocating base plates 46 and 48 to return to their fully retracted positions, as shown in FIG. 2.

For purposes of the present invention, the only component of the press operating mechanism (not shown) which has been illustrated is the link 60. The link 60 may be actuated by a hydraulic cylinder type press operating mechanism, a cam type press operating mechanism or the like. Link 60 may provide both the die closing and the die opening forces in which case the intermediate plate 46 may be tied to the uppermost plate 48 and the base plate 44 by flexible cords to set the maximum opening distance between each plate wherein the die is opened. Alternatively, link 60 may apply only a closing force with the opening force being supplied by a plurality of springs.

For example, first and second high compression return springs 62 and 64 may be positioned concentrically around posts 50. First return spring 62 would engage the lower side 66 of the first reciprocating base plate 46 at one end and seats against the upper side 67 of the stationary base plate 44. Second return spring 64 would engage the lower side 68 of the second reciprocating base plate 48 at one end and seats against the upper side 69 of the first reciprocating base plate 46. The second return spring 64 permanently biases the second reciprocating base plate 48 towards its fully retracted position. The first return spring 62 permanently biases the first reciprocating base plate 46 towards its fully retracted position. The first return spring 62 must be of sufficient strength to cause both the first and second reciprocating base plates 46 and 48 to return to and remain in their fully retracted positions, as shown in FIG. 2 whenever die closing pressure is removed by link 60.

A first forming die cavity 70 for receiving and press forming a first single blank 32 is formed between the stationary base plate 44 and the first reciprocating base plate 46 by a first lower die plate 72 and a first upper die plate 74. The first lower die plate 72 is connected on its lower side 76 to the upper side 67 of the stationary base plate 44. The first upper die plate 74 is connected on its upper side 80 to the lower side 66 of the first reciprocating base plate 46. The upper side of the first lower die plate 72 forms a first lower forming surface 84 and a first top forming surface 85, while the lower side of the first upper die plate 74 forms a first upper forming surface 86. As is illustrated in FIG. 2, a first paperboard blank 32 is positioned between the first lower forming surface 84 and the first upper forming surface 86 in the first forming die cavity 70 and rests o its bottom surface 33 on the first top forming surface 85.

A first lower pressure ring 90 is positioned along the periphery 92 of the first lower die plate 72 for movement between a first position, as shown in FIG. 2, wherein the upper side 96 of the first lower pressure ring 90 is in substantial alignment with the first top forming surface 85 of the first lower die plate 72, and a second position, as shown in FIG. 3, wherein the upper side 96 of the first lower pressure ring 90 is in substantial alignment with the first lower forming surface 84 of the first lower die plate 72. A first spring 98 is positioned between the first lower pressure ring 90 and the stationary base plate 44 for biasing the first lower pressure ring 90 into its first position. As is illustrated in FIG. 2, the first paperboard blank 32 rests on its bottom surface 33 on the first top forming surface 85 and on the upper side 96 of the first lower pressure ring 90.

A first upper pressure ring 100 is positioned along the periphery 102 of the first upper die plate 74. The first upper pressure ring 100 is fixedly attached, on its upper side 104, to the first reciprocating base plate 46, such that the first upper pressure ring 100 moves in conjunction with the reciprocating movement of the first reciprocating base plate 46. The first upper pressure ring 100, on its lower side 106, is in substantial alignment with the first upper forming surface 86. The first lower and upper pressure rings 90 and 100 are provided to clamp the peripheral edges of the first blank 32 retaining the first blank 32 during the press forming operation to prevent the formation of unwanted wrinkles and creases and ensure the proper press formation of the blank 32 into the desired three-dimensional product shape.

In accordance with the preferred embodiment of the present invention, a second forming die cavity 70' for receiving and press forming a second single blank 36 is formed between the first reciprocating base plate 46 and the second reciprocating base plate 48. The arrangement of the components which form the second forming die cavity 70' is the same as the arrangement of components forming the first forming die cavity 70 and like components have been designated with corresponding reference numerals followed by a "'" (i.e., 70 and 70'). Because the second forming die cavity 70' and the components defining it are arranged and function in the same manner as the components of the first forming die cavity 70, a detailed description of the components and function of the components of the second forming die cavity 70' will not be given.

The operation of the preferred embodiment of the press forming apparatus of the present invention can best be understood by referring to the schematic representation illustrated in FIG. 1, and by also referring to FIGS. 2 and 3, which illustrate the operation of the forming section 40.

Referring now to FIG. 1, a continuous paperboard web 4, supplied in the form of a roll, is fed, at a predetermined speed, into a cyclically operating blanking section 10. The speed at which the web 4 is fed into the blanking section 10 must be carefully calculated to ensure that the press forming apparatus 2 is operating with maximum efficiency and at maximum output capacity, while maintaining the proper registration between the web 4 and blanking section 10 and synchronization between the blanking section 10 and forming section 40.

As described above, the multiple forming die cavity design of the present invention allows for the maintenance of the proper registration between the web 4 and blanking section 10 and synchronization between the blanking section 10 and forming section 40, while operating the blanking section 10 at its maximum rate of 80 to 150 cycles per minute.

The cyclic rate of the blanking section 10 is set according to the speed at which the web 4 is fed into the blanking section 10. The registration device 8 controls the cyclic operation of the blanking section 10 by sending a signal to the cutting die 12 to perform the cutting operation upon the detection of the repetitive characteristic (i.e., design or pattern and/or spacing marks) printed on the web 4. The pattern and/or spacing marks are spaced apart such that when the photosensory controller 6 of the registration device 8 detects a change in the design or pattern or a spacing mark (i.e., photo-target) a signal is sent to the cutting die 12 indicating that the cutting operation should be performed, as the web 4 is now properly positioned (i.e., in register) in the blanking section 10 such that the cut blank 30 will have the desired design or pattern printed thereon.

The web 4 is fed into the blanking section 10 so that the blanking section 10 will operate at its maximum rate of 80 to 100 cycles per minute, resulting in the production of 80 to 100 paperboard blanks 30 per minute. As the web 4 passes under the photosensory controller 6, a blank 30 will be cut by the cutting die 12 of the blanking section 10 upon the detection of a first photo-target. As soon as the blank 30 (hereinafter referred to as the "first blank 32") is cut, it will begin to move out of the blanking section 10 and the web 4 will be advanced in preparation for the cutting of a second blank.

The first blank 32 moves out of the blanking section 10 on to the movable guide 20, which is initially in its first position, depicted by the phantom lines in FIG. 1. The web 4 continues to advance until the first blank 32 is completely out of the blanking section 10, at which time the photosensory controller 6 will detect a second photo-target causing the cutting die 12 to cut a blank 30 (hereinafter referred to as the "second blank 36").

During the blanking of the second blank 36, the first blank 32 is directed from the movable guide 20 to the first stationary guide 24. The movable guide 20 will then begin to move upwardly from its first position, shown in phantom in FIG. 1, to its second position. During the upward movement of the movable guide 20, the second blank 36 will begin to move out of the blanking section 10 on to the movable guide 20 and the web 4 will continue to be advanced in preparation for the cutting of a third blank. When the movable guide 20 reaches its second position, as shown in FIG. 1, the second blank 36 is directed from the movable guide 20 to the second stationary guide 28.

During the movement of the second blank 36 from the movable guide 20 to the second stationary guide 28, the first blank 32 is fed into the forming section 40 from the first stationary guide 24.

Referring to FIGS. 2 and 3, the first blank 32 is fed into the die set 42 of the forming section 40. The die set 42, in the preferred embodiment, includes a first forming die cavity 70 for receiving the first blank 32 and a second forming die cavity 70' for receiving the second blank 36.

At the start of the forming section cycle, the first and second reciprocating base plates 44 and 46 are in their fully retracted positions, as shown in FIG. 2, forming the first and second forming die cavities 70 and 70'. The first blank 32, which is produced from one blanking cycle of the blanking section 10, is fed into the first forming die cavity 70 of the die set 42. The first blank 32 rests on its bottom surface 33 on the first top forming surface 85 and the upper side 96 of the first lower pressure ring 90. The second blank 36, which is produced from a subsequent blanking cycle of the blanking section 10, is fed into the second forming die cavity 70'. The second blank 36 rests on its bottom surface 37 on the second top forming surface 85' and the upper side 96' of the second lower pressure ring 90'.

As soon as the first and second blanks 32 and 36 are positioned in the first and second forming die cavities 70 and 70', the press operating mechanism (not shown) is activated causing the inward movement of the link 60. The inward movement of the link 60 causes the second reciprocating base plate 48 to move inwardly against the force of the second return spring 64.

As the second reciprocating base plate 48 continues to move inwardly, the lower side 106' of the second upper pressure ring 100' engages the second blank 36 on its top surface 38. The top and bottom peripheral surfaces of the second blank 36 are now clamped between the upper side 96' of the second lower pressure ring 90' and the lower side 106' of the second upper pressure ring 100' retaining the second blank 36 in place for engagement by the second upper forming surface 84'. A more detailed explanation of the function and operation of the upper and lower pressure rings is disclosed in U.S. Pat. No. 4,381,278 to Ingraffea, which is incorporated by reference herein. Upon further inward movement of the second reciprocating base plate 48, the second lower stop 90' is urged inwardly against the force of second spring 98' and the second upper forming surface 86' engages the top surface 38 of the second blank 36.

The second reciprocating base plate 48 and second upper forming surface 86' continue to move inwardly pressing the second blank 36 into the desired three-dimensional product shape defined by the second lower, top and upper forming surfaces 84', 85' and 86'. As the pressing operation occurs, the top and bottom peripheral surfaces of the second blank 36, which are clamped between the second lower and upper pressure rings 90' and 100', are drawn towards the longitudinal axis 41 passing through the center of the second blank 36.

The second reciprocating base plate 48 continues to move inwardly until the second upper forming surface 86', second blank 36 and second lower forming surface 84' are in compressive engagement, drawing the peripheral surfaces of the second blank 36 completely out of the second upper and lower pressure rings 90' and 100' and fully compressing the second return spring 64.

The press operating mechanism (not shown) will continue to move the link 60 inwardly with sufficient force to cause the compression of the first return spring 62, causing the first reciprocating base plate 46 to move inwardly towards the stationary base plate 44. As the first reciprocating base plate 46 moves inwardly, the lower side 106 of the first upper pressure ring 100 engages the first blank 32 on its top surface 34. The top and bottom peripheral surfaces of the first blank 32 are now clamped between the upper side 96 of the first lower pressure ring 90 and the lower side 106 of the first upper pressure ring 100 retaining the first blank 32 in place for engagement by the first upper forming surface 86. Upon further inward movement of the first reciprocating base plate 46, the first lower stop 90 is urged inwardly against the force of first spring 98 and the first upper forming surface 86 engages the top surface 34 of the first blank 32.

The first reciprocating base plate 46 and first upper forming surface 86 continue to move inwardly pressing the first blank 32 into the desired three-dimensional product shape defined by the first lower, top and upper forming surfaces 84, 85 and 86. As the pressing operation occurs, the top and bottom peripheral surfaces of the first blank 32, which are clamped between the first lower and upper pressure rings 90 and 100, are drawn towards the longitudinal axis 41 passing through the center of the first blank 32.

The first reciprocating base plate 46 continues to move inwardly until the first upper forming surface 86, first blank 32 and first lower forming surface 84 are in compressive engagement, drawing the peripheral surfaces of the first blank 32 completely out of the first upper and lower pressure rings 90 and 100 and fully compressing the first return spring 62. The first and second reciprocating base plates 46 and 48 are now in their fully advanced positions, as shown in FIG. 3., wherein the first lower forming surface 84, first top forming surface 85, first blank 32 and first upper forming surface 86 are in compressive engagement and the second lower forming surface 84', second top forming surface 85'. second blank 36 and second upper forming surface 86' are also in compressive engagement.

The compressive forces exerted on the first blank 32 and the second blank 36 are sufficient to cause fiber bonding to occur, ensuring that the finished three dimensional paperboard products will be sufficiently rigid to withstand the forces exerted on the products during normal use.

Press formation of the blanks 32 and 36 is now completed and the link 60 is caused to retract. The first return spring 62 causes the outward movement of the first and second reciprocating base plates 46 and 48. Outward movement of the first and second reciprocating base plates 46 and 48 will continue until the first reciprocating base plate 46 returns to its fully retracted position. The second reciprocating base plate 48 is caused to move further to its outermost, fully retracted position by the second return spring 64. During retraction of the first and second reciprocating base plates 46 and 48, the three dimensional products produced from the press forming operation are removed from the forming die cavities 70 and 70'. When the second reciprocating base plate 48 moves to its fully retracted position, as shown in FIG. 2, the forming cycle is completed.

The forming section 40 operates, preferably, at its maximum rate of 40 to 50 cycles per minute. By including a die set 42 with two separate forming die cavities 70 and 70', the forming section 40 is able to operate in conjunction with a blanking section 10 also operating at its maximum rate, preferably, 80 to 100 cycles per minute. Therefore, the blanking section 10 is operating at approximately twice the speed of the forming section 40. By operating a press forming apparatus at a 2:1 blanking to forming operation ratio, the substantially faster maximum blanking section rate is not required to be decreased to accommodate the much slower forming section rate.

In addition to increasing overall output capacity by allowing for operation of both the blanking and forming sections at their maximum rates, the multiple forming die cavity design of the present invention greatly improves the operating efficiency of the press forming apparatus by substantially decreasing the number of forming section cycles required to produce a substantially increased number of products. In the preferred embodiment, the die set 42 includes two forming die cavities 70 and 70'. The blanking section 10 is operating at its preferred maximum rate of 80 to 100 cycles per minute and the forming section 40 is operating at its preferred maximum rate of 40 to 50 cycles per minute. The resulting number of three dimensional paperboard products produced per minute is 80 to 100, with the forming section 40 performing 40 to 50 cycles. The production of 80 to 100 products, as a result of 40 to 50 forming section cycles, increases the efficiency of the apparatus to twice that of the typical prior art press forming apparatus described above.

Figure 4:
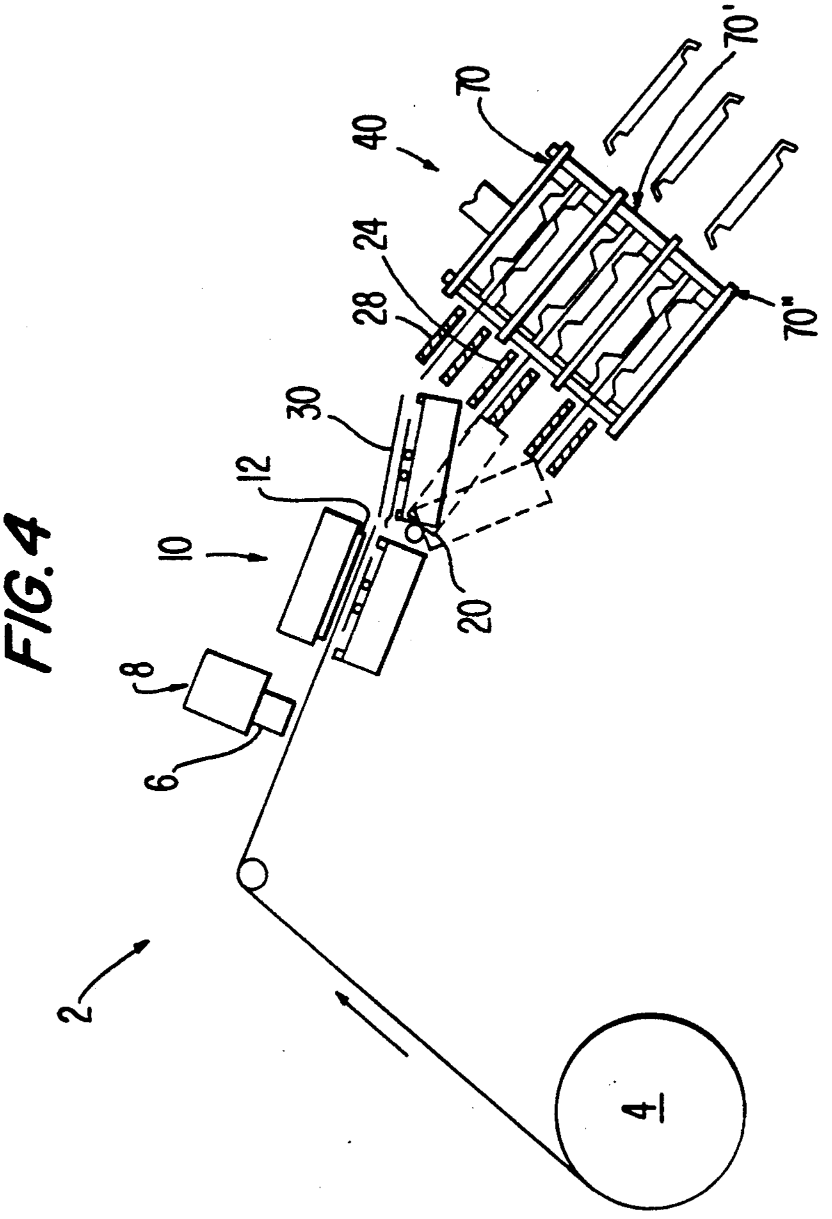
FIG. 4 is a schematic representation of the apparatus of the present invention including three forming die cavities.

While the number of paperboard products produced per forming cycle, in the preferred embodiment, is two, the subject invention should not be considered as being limited to this number. A die set 42 could be designed, in accordance with the present invention, with, for example, three forming die cavities 70, 70' and 70'', thereby resulting in the production of three products per forming section cycle. FIG. 4 illustrates press forming apparatus 2 incorporating three die cavities. A forming section including a die set having three forming die cavities would increase the efficiency of the apparatus to three times that of the typical prior art press forming apparatus described above.

The increase in the number of forming die cavities of the die set, from a single cavity design, requires only minimal modification to already existing press forming apparatus. For example, the second forming die cavity 70' and the components which form the cavity 70' (i.e., the second lower die plate 72', the second upper die plate 74' and the second reciprocating base plate 48) are designed to be retrofit in vertically stacked relationship with the first forming die cavity 70, to existing single cavity die sets with only minor modification. The novel vertically stacked die set design of the present invention permits a plurality of forming die cavities in the die set without requiring any increase in the manufacturing floor space utilized.

The increase in efficiency and output capacity which results from the operation of the subject invention, unlike the prior art press forming apparatus discussed above, does not negatively affect the rigidity or shape definition of the three dimensional paperboard products produced. Product rigidity and shape definition are maintained by performing press forming on a single blank in each forming die cavity, unlike the multiple blank per cavity designs of the prior art. It is crucial to the formation of a high quality finished paperboard product having the desired rigidity and shape definition, that only a single blank 30 be placed in the first or second forming die cavities 70 and 70' for each cycle of press forming operation. Placing multiple blanks in a single forming die cavity results in the lack of adequate control over the compressive forces which are crucial to the consistent formation of rigid, well-defined paperboard products. The compressive forces placed on the blank must be sufficient to cause fiber bonding to occur, imparting the product with sufficient rigidity to withstand the stresses experienced during normal use by the ultimate consumer. The lack of control over the compressive forces in the operation of press forming apparatus of the multiple blank per cavity design, results in products wherein insufficient fiber bonding has occurred causing a substantial decrease in product rigidity. Further, the differing relative positions of the multiple blanks within a single die cavity with respect to the forming surfaces of the die cavity results in the products having differing,. distorted shapes.

The multiple forming die cavity design of the present invention, unlike the prior art apparatus discussed above, requires only a single web, web feeding mechanism and registration device. In order to achieve the press formation of a rigid, well-defined three-dimensional product having the desired shape and patterning, the multiple forming die cavity apparatus of the prior art required multiple webs, web-feeding mechanisms and registration devices. The use of only a single web, web feeding mechanism and registration device with a multiple forming die cavity die set allows for the increase in efficiency and output capacity noted above and the production of press formed products having the desired shape, rigidity and patterning characteristics, without the added expense and space requirements associated with the prior art devices.

As is apparent from the above discussion, the novel and advantageous design and operation of the present invention allows for the production of press formed three dimensional paperboard products consistently having superior rigidity and shape definition, while operating with maximum efficiency and output capacity.

The invention of the subject application should not be viewed as being limited to the embodiment shown. Numerous forming section die sets are possible having the multiple forming die cavity design of the present invention. For example, the forming die set may have more than three forming die cavities and the forming surfaces of the forming die plates defining the forming die cavities may be shaped to form numerous types and sizes of press formed products, such as, round-shaped or rectangular-shaped plates, trays, bowls or platters. In addition, the material from which the press formed products are formed should not be limited to paperboard, as the present invention could be utilized to press form products made of thermoplastic materials or the like. These design changes may be made without departing from the spirit and scope of the invention as the same will now be understood by those skilled in the art as encompassing the full scope of the appended claims.

Industrial Applicability

This invention has particular utility in the production of press formed products, Wherein such production requires the maximization of output capacity (i.e., press forming of the maximum number of products per minute) and wherein such products require accurate shape definition and substantial rigidity. Examples of such products include paperboard plates, bowls, platters and trays.

I claim:

1. An apparatus for receiving a paper web and press forming blanks into three-dimensionally shaped products comprising:

(a) a cyclically operating blanking means for cutting the paper web into a single paper blank per blanking cycle at a rate of at least 80 blanking cycles per minute;

(b) a cyclically operating forming means for receiving a plurality of said single blanks from said blanking means during a first portion of each forming cycle and for simultaneously press forming said plurality of said single blanks into a plurality of products having the desired shape during a second portion of each forming cycle, said forming means including a stacked die set having a plurality of forming die cavities arranged one above another in a manner causing all of the die cavities to open and close together in a direction which is oblique to a vertical plane, and each of said forming die cavities being constructed to receive only a single blank; and (c) guide means for cyclically transferring a single paperboard blank from said blanking means into each of said die cavities during said first portion of each forming cycle, said guide means including a plurality of stationary guide means, each of which is disposed in alignment with a respective one of said die cavities for receiving and transferring a single paper blank into the respective die cavity aligned therewith during each forming cycle, and a movable guide means for receiving each paper blank from the blanking means and for successively moving and transferring said paper blank into each of said stationary guide means; wherein said movable guide means has an inlet end positioned in proximity to an outfeed side of said blanking means and an outlet end which is successively movable into proximity with an infeed side of each of said stationary guide means during each forming cycle.

2. An apparatus as defined in claim 1, wherein said blanking means is designed to operate cyclically at a predetermined rate of at least 90 cycles per minute and the die set of said forming means includes 2 forming cavities.

3. An apparatus as defined in claim 1, wherein said cyclically operating blanking means is designed to operate at a predetermined rate of at least 90 cycles per minute and the die set of said forming means includes 3 forming cavities.

4. An apparatus as defined in claim 1, wherein said blanking means is designed to operate cyclically at a predetermined rate of at least 100 cycles per minute and the die set of said forming means includes 2 forming cavities.

5. An apparatus as defined in claim 1, further comprising a registration means for properly registering said web with said blanking means.

6. An apparatus as claimed in claim 5, wherein said registration means includes sensing means for detecting repeating characteristics of said web to control the cyclic operation of said blanking means in a manner to cause all of said plurality of blanks to have the same positioned relationship, whereby only a single registration means is required to assure properly registered blanks for all of said plurality of forming die cavities.

* * * * *